United States Patent
Yang et al.

(10) Patent No.: US 7,184,107 B2
(45) Date of Patent: Feb. 27, 2007

(54) LIQUID CRYSTAL DISPLAY DEVICE AND METHOD OF FABRICATING THE SAME

(75) Inventors: Joon Young Yang, Bucheon (KR); Yong In Park, Seoul (KR); Sang Hyun Kim, Anyang (KR)

(73) Assignee: LG.Philips LCD Co., Ltd., Seoul (KR)

( * ) Notice: Subject to any disclaimer, the term of this patent is extended or adjusted under 35 U.S.C. 154(b) by 290 days.

(21) Appl. No.: 10/878,363

(22) Filed: Jun. 29, 2004

(65) Prior Publication Data
US 2005/0134756 A1 Jun. 23, 2005

(30) Foreign Application Priority Data
Dec. 23, 2003 (KR) ...................... 10-2003-0095766

(51) Int. Cl.
*G02F 1/1368* (2006.01)
*H01L 29/12* (2006.01)
*H01L 21/00* (2006.01)

(52) U.S. Cl. .......................... 349/43; 349/187; 257/72; 438/30

(58) Field of Classification Search ................. 349/43, 349/139, 143, 187; 257/59, 72; 438/30, 438/151, 155, 161, 618, 624, 637
See application file for complete search history.

(56) References Cited

U.S. PATENT DOCUMENTS 6,204,520 B1 * 3/2001 Ha et al. ....................... 257/72
2004/0252250 A1 * 12/2004 Yang et al. ................... 349/43

* cited by examiner

*Primary Examiner*—Toan Ton
*Assistant Examiner*—Tai Duong
(74) *Attorney, Agent, or Firm*—Morgan, Lewis & Bockius LLP

(57) ABSTRACT

A method of fabricating a liquid crystal display device includes forming an active pattern on a substrate, forming a first insulating layer on the substrate over the active pattern, forming a gate line including a gate electrode and a data line on the substrate, the data line including a plurality of segmented portions electrically disconnected from each other, forming source and drain regions in the active pattern, forming a second insulating layer on the first insulating layer, the gate line, and the data line, simultaneously forming a pair of first contact holes through the first and second insulating layers, a second contact hole through the second insulating layer, and a pair of third contact holes through the second insulating layer, forming a conductive material along an entire surface of the substrate, and patterning the conductive material to form a drain electrode, a first connection line, and a second connection line on the second insulating layer.

27 Claims, 8 Drawing Sheets

LIQUID CRYSTAL DISPLAY DEVICE AND METHOD OF FABRICATING THE SAME

The present invention claims the benefit of Korean Patent Application No. 2003-095766, filed in Korea on Dec. 23, 2003, which is hereby incorporated by reference.

BACKGROUND OF THE INVENTION

1. Field of the Invention

The present invention relates to a display device and a method of fabricating a display device, and more particularly, to a liquid crystal display (LCD) device and a method of fabricating an LCD device.

2. Description of the Related Art

As the need for visual display devices increases, requirements for improved display devices having low power consumption, thin profiles, light weight, and high image quality have increased. Since operational characteristics of LCD devices satisfy these requirements and are suitable for mass-production, various new LCD devices are being developed. Accordingly, LCD devices are gradually replacing cathode ray tube (CRT) devices.

In general, LCD devices display images by adjusting light transmittance ratios of liquid crystal cells by respectively supplying data signals according to image information to the liquid crystal cells arranged as a matrix configuration. Accordingly, an LCD device includes a color filter substrate, an array substrate, and a liquid crystal material layer formed between the color filter and array substrates. In addition, a thin film transistor (TFT) is commonly used as a switching device of the LCD device, wherein a channel layer of the TFT includes one of an amorphous silicon thin film or a polycrystalline silicon thin film.

During fabrication of the LCD device, a relatively large number of mask processes (i.e., photolithographic processes) are required to fabricate the array substrate, including the TFTs. Accordingly, reducing the number of mask processes will improve productivity and reduce manufacturing costs.

FIG. 1 is a plan view of an array substrate of an LCD device according to the related art. In FIG. 1, a plurality of gate lines 16 and data lines 17 are arranged along horizontal and vertical directions, respectively, on an array substrate 10 to define a plurality of pixel regions. In addition, a TFT is formed at each crossing region of the gate and data lines 16 and 17, and a pixel electrode 18 is formed at each of the pixel regions. The TFT is composed of a gate electrode 21 connected to the gate line 16, a source electrode 22 connected to the data line 17, and a drain electrode 23 connected to the pixel electrode 18. Although not shown, the TFT includes first and second insulating layers for insulating the gate electrode 21 and the source/drain electrodes 22 and 23. In addition, the TFT includes an active layer 24 for forming a conductive channel between the source electrode 22 and the drain electrode 23 by a gate voltage supplied to the gate electrode 21.

In FIG. 1, the source electrode 22 is electrically connected to a source region of the active layer 24 through a first contact hole 40a formed on the insulating layers (not shown), and the drain electrode 23 is electrically connected to a drain region of the active layer 24 through the first contact hole 40a. Although not shown, a third insulating layer is provided with a second contact hole 40b and is formed on the drain electrode 23 so that the drain electrode 23 and the pixel electrode 18 are electrically interconnected to each other through the second contact hole 40b.

FIGS. 2A to 2F are cross sectional views along I–I' of FIG. 1 of fabrication processes for the LCD according to the related art device. In FIG. 2A, an active pattern 24 composed of a polycrystalline silicon layer is formed on the substrate 10 using a photolithographic process.

In FIG. 2B, a first insulating layer 15a and a conductive metal layer are sequentially deposited along an entire surface of the substrate 10 where the active pattern 24 is formed. Then, the conductive metal material is patterned by using a photolithographic process, thereby forming a gate electrode 21 on the active pattern 24 with the first insulating layer 15a disposed therebetween. Then, a high concentration of impurity ions are injected into predetermined regions of the active pattern 24 using the gate electrode 21 as a mask, thereby forming p+ or n+ type source/drain regions 24a and 24b.

In FIG. 2C, a second insulating layer 15b is deposited along an entire surface of the substrate 10 where the gate electrode 21 is formed. Then, the second and first insulating layers 15b and 15a are partially removed by a photolithographic process, thereby forming first contact holes 40a that partially expose the source/drain regions 24a and 24b.

In FIG. 2D, a conductive metal material is deposited along an entire surface of the substrate 10 and a photolithographic process is performed, thereby forming a source electrode 22 connected to the source region 24a and a drain electrode 23 connected to the drain region 24b through the first contact hole 40a. In addition, a portion of the conductive metal layer constituting the source electrode 22 extends along one direction to constitute a data line 17.

In FIG. 2E, a third insulating layer 15c is deposited along an entire surface of the substrate 10, and a second contact hole 40b is formed by a photolithographic process to expose a portion of the drain electrode 23.

In FIG. 2F, a transparent conductive material is deposited along an entire surface of the substrate 10 where the third insulating layer 15c is formed, and a pixel electrode 18 is formed by a photolithographic process to be connected to the drain electrode 23 through the second contact hole 40b.

During fabrication of the polycrystalline silicon TFT (poly-TFT) of the LCD device, at least six separate photolithographic processes are required to pattern the active pattern, the gate electrode, the first contact hole, the source/drain electrode, the second contact hole, and the pixel electrode. Each of the photolithographic processes includes a series of processes for forming a desired pattern by transferring a pattern formed on a mask onto a substrate where a thin film is deposited, a plurality of processes including photoresist deposition, light exposure, and development processes. Accordingly, these photolithographic processes lower production yield and may create defects during formation of the TFT. In addition, since patterning masks are very expensive, as the number of patterning masks increases, fabrication costs proportionally increase.

SUMMARY OF THE INVENTION

Accordingly, the present invention is directed to an LCD device and a method of fabricating an LCD device that substantially obviates one or more of the problems due to limitations and disadvantages of the related art.

An object of the present invention is to provide an LCD device having a TFT device fabricated using a reduced number of fabrication masks.

Another object of the present invention is to provide a method of fabricating an LCD device using a reduced number of fabrication masks.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming an active pattern on a substrate, forming a first insulating layer on the substrate over the active pattern, forming a gate line including a gate electrode and a data line on the substrate, the data line including a plurality of segmented portions electrically disconnected from each other, forming source and drain regions in the active pattern, forming a second insulating layer on the first insulating layer, the gate line, and the data line, simultaneously forming a pair of first contact holes through the first and second insulating layers, a second contact hole through the second insulating layer, and a pair of third contact holes through the second insulating layer, forming a conductive material along an entire surface of the substrate, and patterning the conductive material to form a drain electrode, a first connection line, and a second connection line on the second insulating layer.

In another aspect, a liquid crystal display device includes an insulating substrate, an active pattern formed on the insulating substrate, the active pattern having source, drain, and channel regions, a first insulating layer formed on the insulating substrate and the active pattern, a gate line including a gate electrode and a data line formed on the first insulating layer, the data line including a plurality of segmented portions each electrically disconnected from each other, a second insulating layer formed on and between the gate line, the gate electrode, and the plurality of segmented portions of the data line, and a plurality of transparent conductive material segments on the second insulating layer, wherein the first and second insulating layers include a pair of first contact holes exposing the source and drain regions of the active pattern, and the second insulating layer includes a second contact hole exposing a first lateral portion of a first one of the segment portions of the data line, and a pair of third contact holes exposing a second lateral portion of the first one of the segment portions of the data line and exposing a first lateral portion of a second one of the segment portions of the data line.

It is to be understood that both foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
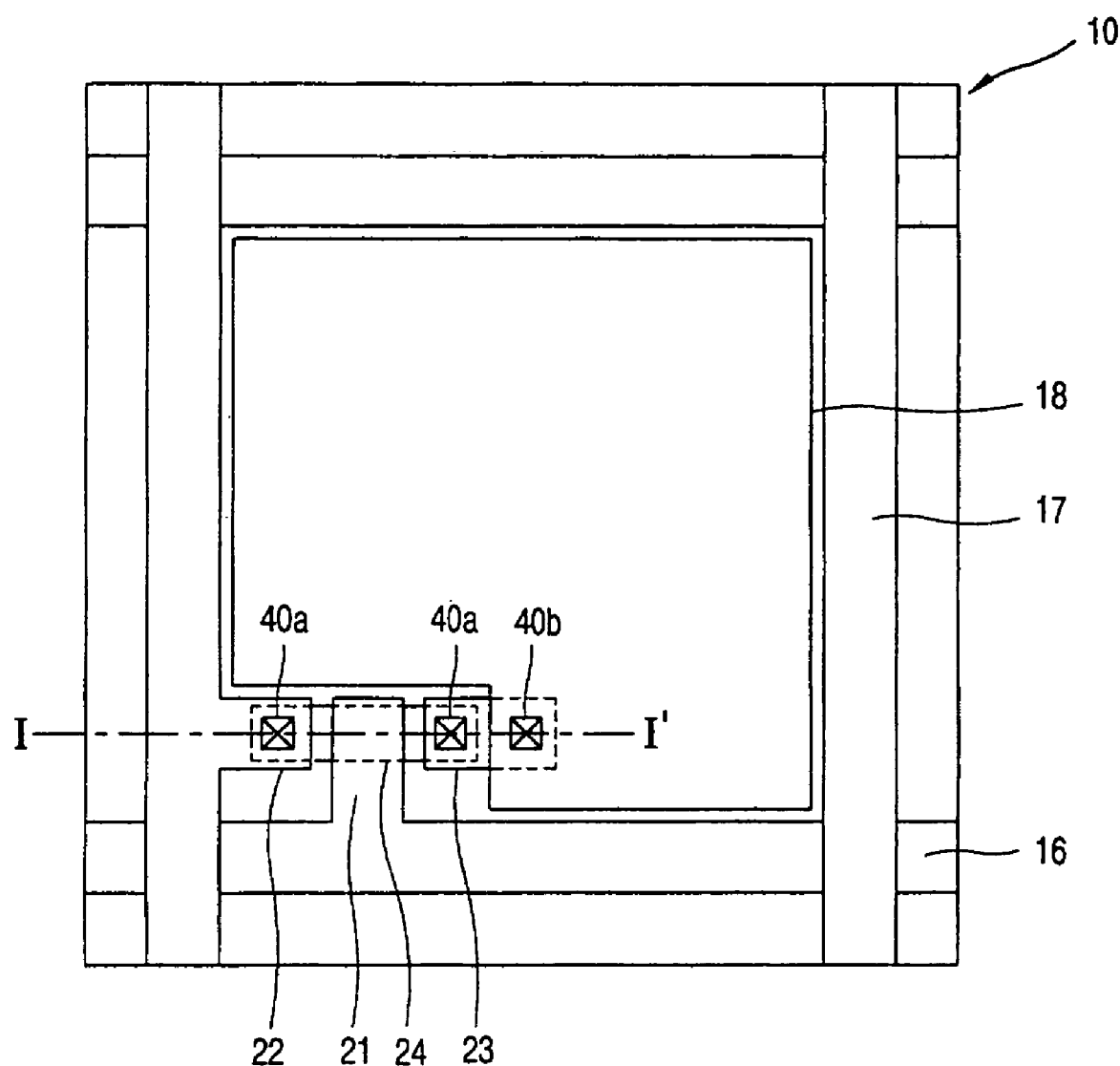
FIG. 1 is a plan view of an array substrate of an LCD device according to the related art.
Figure 2A:
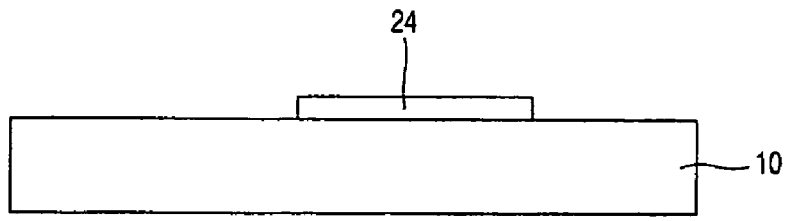
FIGS. 2A to 2F are cross sectional views along I–I' of FIG. 1 of fabrication processes for the LCD according to the related art device.
Figure 2B:
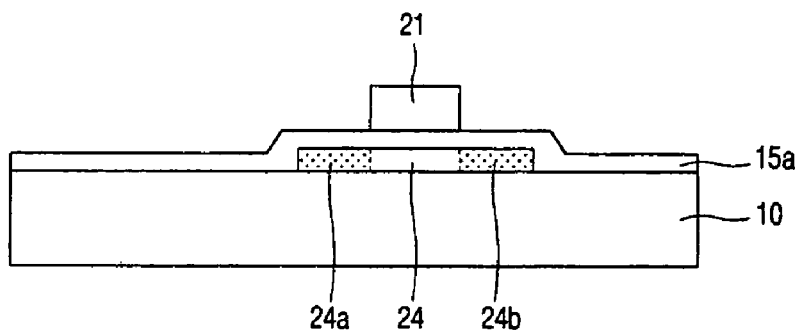
Figure 2C:
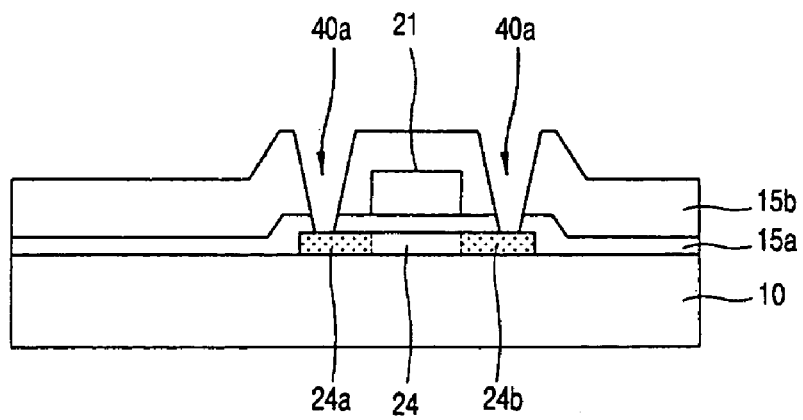
Figure 2D:
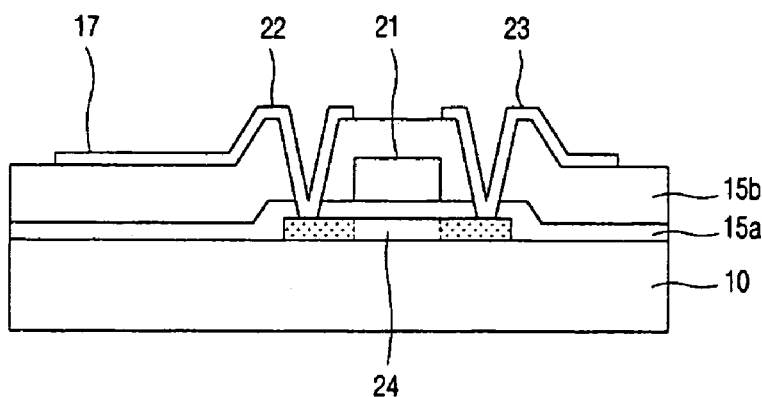
Figure 2E:
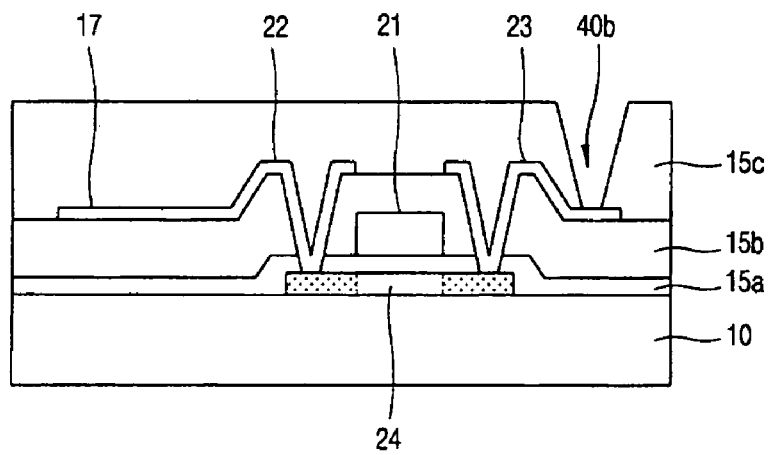
Figure 2F:
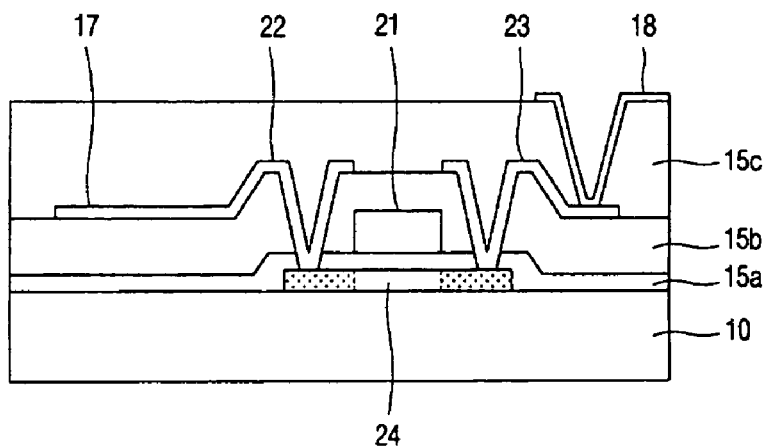
Figure 3:
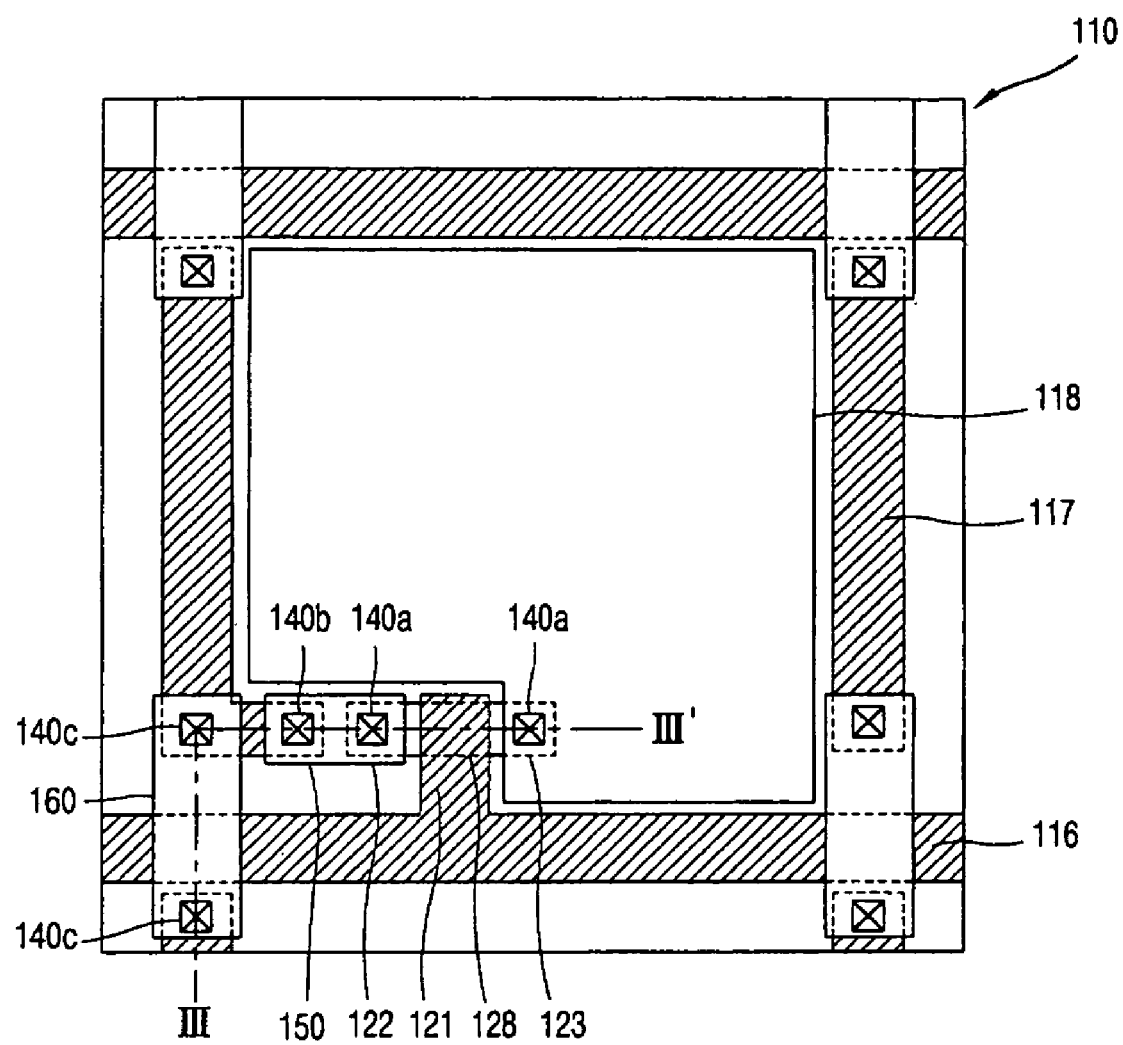
FIG. 3 is a plan view of an exemplary array substrate of an LCD device according to the present invention.

FIG. 3 is a plan view of an exemplary array substrate of an LCD device according to the present invention. As shown in FIG. 3, although a single pixel is shown to provide a brief explanation of the device, an N-number of gate lines and an M-number of data lines may be formed to cross each other, thereby forming an N×M matrix array of pixels.

In FIG. 3, an array substrate 110, which may be formed of a transparent material, may include a pixel electrode 118 formed on a pixel region, a gate line 116 and a data line 117 arranged along horizontal and vertical directions, respectively, on the substrate 110, respectively, and a TFT device may be formed at intersection regions between the gate and data lines 116 and 117. The intersection regions between the gate and data lines 116 and 117 may include disconnecting structures, wherein segmented portions of each data line 117 may be electrically connected to each other by a second connection line 160 formed on a second insulating layer (not shown) overlying the gate line 116.

The TFT device may include a gate electrode 121 connected to the gate line 116, a source electrode 122 connected to the data line 117, and a drain electrode 123 connected to the pixel electrode 118. Although not shown, the TFT device may include first and second insulating layers for insulating the gate electrode 121 and the source/drain electrodes 122 and 123, and an active layer for forming a conductive channel between the source electrode 122 and the drain electrode 123 by a gate voltage supplied to the gate electrode 121.

In FIG. 3, a first portion of the source electrode 122 may be electrically connected to a source region of the active layer 124 through a first contact hole 140a formed through the second insulating layer (not shown) and a third insulating layer (not shown), and a first portion of the drain electrode 123 may be electrically connected to a drain region of the active layer (not shown). Similarly, a second portion the source electrode 122 may constitute a first connection electrode 150 that may be electrically connected to the data line 117 through the second contact hole 140b formed through the second insulating layer (not shown). In addition, a second portion of the drain electrode 123 may extend towards the pixel region to constitute the pixel electrode 118. The pixel electrode 118 may be formed by being simultaneously patterned with the source/drain electrodes 122 and 123 and the first and second connection lines 150 and 160, thereby reducing the number of masks used to fabricating the TFT device.

Figure 4A:
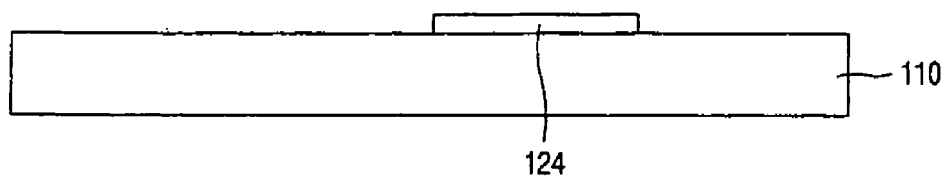
FIGS. 4A to 4E are cross sectional views along III–III' of FIG. 3 of an exemplary method of fabricating an LCD device according to the present invention.

FIGS. 4A to 4E are cross sectional views along III–III' of FIG. 3 of an exemplary method of fabricating an LCD device according to the present invention. In FIG. 4A, an active pattern 124 may be formed on the transparent substrate 110, which may be formed of glass. Alternatively, a buffer layer composed of a silicon oxidation layer ($SiO_2$) may be formed on the substrate 110, and the active pattern 124 may be formed on the buffer layer. Accordingly, the buffer layer may prevent impurities from migrating (i.e., leaching) of the glass substrate 110 into upper layers during subsequent fabrication processes.

In FIG. 4A, the silicon layer 124 may be formed by patterning an amorphous silicon thin film or patterning a polycrystalline silicon thin film. According to the present invention, the silicon layer may be formed of a polycrystalline silicon thin film. The polycrystalline silicon thin film may be formed by using a crystallization method after depositing an amorphous silicon thin film onto the substrate 110.

For example, the amorphous silicon thin film may be deposited by a low pressure chemical vapor deposition (LPCVD) method of a plasma enhanced chemical vapor deposition (PECVD) method. Then, a dehydrogenation process for removing hydrogen within the amorphous silicon thin film may be performed, and crystallization of the amorphous silicon thin film may be performed using one of a solid phase crystallization (SPC) method or an excimer laser annealing (ELA) method using a laser. During the ELA method, a pulsed laser may be used.

However, a sequential lateral solidification (SLS) method may improve crystallization characteristics by growing grains along horizontal directions. The SLS method makes use of grain growth toward a vertical direction at an interface between a liquid phase silicon and a solid phase silicon. The SLS method improves sizes of silicon grains by laterally growing the grains to a predetermined length by properly controlling a size of laser energy and an irradiation range of a laser beam.

Figure 4B:
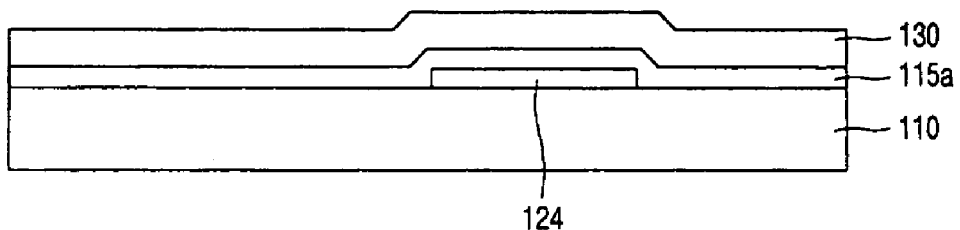

In FIG. 4B, a first insulating layer 115a may be formed on the substrate 110, and a conductive metal layer 130 may be formed on the first insulating layer 115a. For example, the conductive metal layer 130 may include Al, Al alloy, W, Cu, Cr, and Mo in order to form gate and data lines.

Figure 4C:
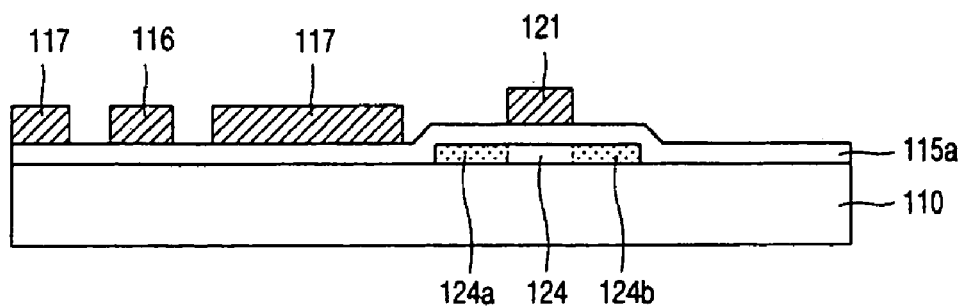

In FIG. 4C, the conductive metal layer 130 may be patterned by using a photolithography process, thereby forming the gate line 116 including the gate electrode 121 and the data line 117. Since the gate line 116 and the data line 117 may be formed from the same material layer and may be formed upon the first insulating layer 115a, overlapping portions of the gate and data lines 116 and 117 may be generated. In order to prevent the overlapping portions, the gate line 116 or the data line 117 may be disconnected at intersection regions between the gate line 116 and the data line 117. For example, the data line 117 may be formed as a plurality of segmented portions along opposing sides of the gate line 116. Alternatively, the gate line 116 may be formed as a plurality of segmented portions along opposing sides of the data line 116.

Then, impurity ions may be injected into predetermined regions of the active pattern 124 by using the gate electrode 121 as a mask to form a source region 124a and a drain region 124b. Accordingly, the gate electrode 121 may function as an ion stopper to prevent the impurity ions from being introduced into a channel region of the active pattern 124. Electric characteristics of the active pattern 124 may be varied according to types of injected impurity ions used. For example, if the injected impurity ions correspond to the third group of the Periodic Table (Group III), such as boron, the active pattern 124 may function as a P-type TFT device. Conversely, if the injected impurity ions correspond to the fifth group of the Periodic Table (Group V), such as phosphorous, the active pattern 124 may function as an N-type TFT device. After the impurity ion injection process, activation of the injected impurity ions may be performed.

Figure 4D:
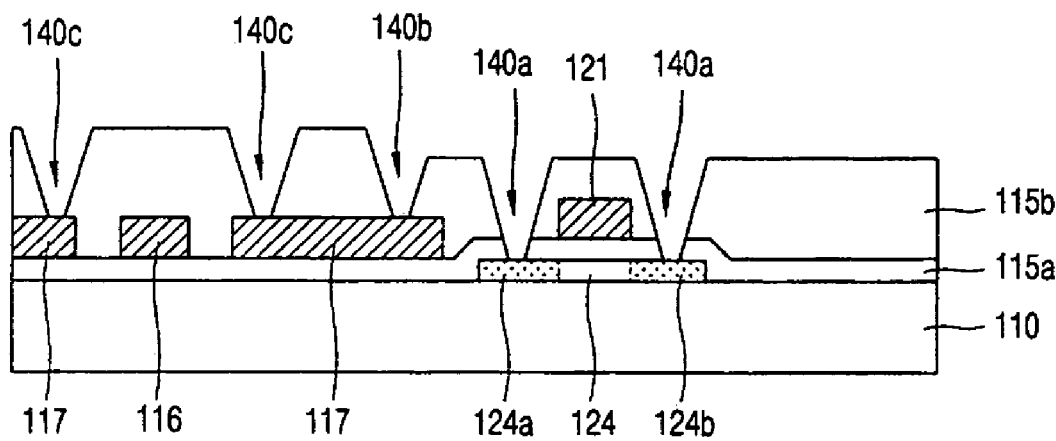

In FIG. 4D, a second insulating layer 115b may be deposited along an entire surface of the substrate 110 including the gate electrode 121. Then, the second insulating layer 115b and the first insulating layer 115a may be partially removed by a photolithographic process, thereby forming first contact holes 140a that may partially expose the source region 124a and the drain region 124b. In addition, the second insulating layer 115b may be partially removed, thereby forming a second contact hole 140b that may expose a first lateral portion of a first segment of the data line 117, and forming a first one of third contact holes 140c that exposes a second lateral portion of the first segment of the data line 117. In addition, a second one of the third contact holes 140c may expose a first lateral portion of a second segment of the data line 117. For example, the second insulating layer 115b may be formed of a transparent organic insulating material, such as benzocyclobutene (BCB) or acryl resin, for achieving a high aperture ratio. Although the contact holes 140a, 140b, and 140c are shown having a "V" shape, other geometrical shapes may be used. Moreover, combinations of different geometrical shapes may be used to form the first, second, and third contact holes 140a, 140b, and 140c.

Figure 4E:
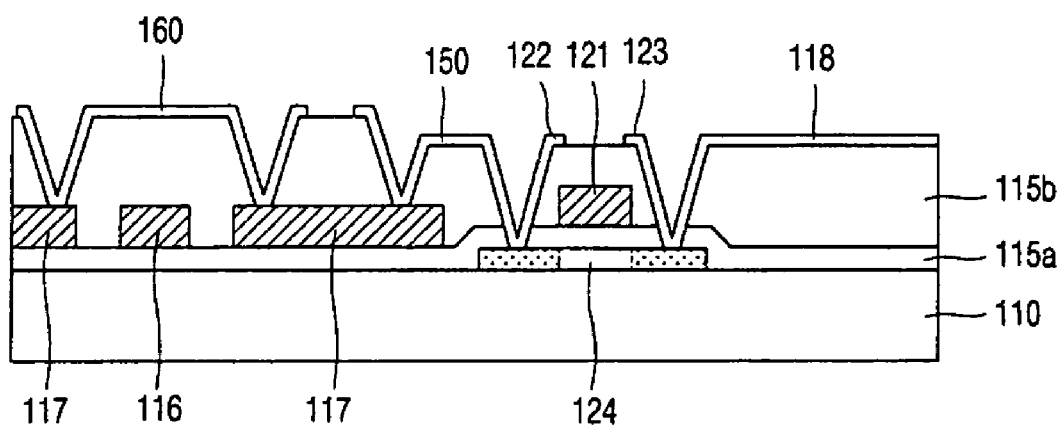

In FIG. 4E, a transparent conductive material having an excellent transmissivity, such as indium tin oxide (ITO) or indium zinc oxide (IZO), may be deposited along an entire surface of the substrate 110 and patterned using a photolithographic process. Accordingly, the first connection line 150 may be formed to include a first portion corresponding to a source electrode 122 connected to the source region 124a through a first one of the first contact holes 140a, and may include a second portion electrically connected to the exposed first lateral portion of the first segment of the data line 117 through the second contact hole 140b. In addition, the second connection line 160 may be formed to include a first portion connected to the exposed second lateral portion of the first segment of the data line 177 through the first one of the pair of third contact holes 140c, and may include a second portion connected to the first lateral portion of the second segment of the data line 117 through the second one of the pair of third contact holes 140c. Furthermore, the transparent conductive material may be patterned to form a drain electrode 123, wherein a first portion of the drain electrode 123 contacts the drain region 124b through the a second one of first contact holes 140a and a second portion of the drain electrodes 123 may extend along a surface of the second insulating layer 115b into a pixel region to function as a pixel electrode 118.

Although only two contact holes 140b and 140c are shown to expose the lateral portions of the data line 117, multiple contact holes may be formed to expose a corresponding number of surfaces of the data line 117. Accordingly, contact resistance between the data line 117 and the subsequently-formed first and second connection lines 150 and 160 may be reduced.

According to the present invention, the gate line and the data line may be simultaneously patterned by forming first and second contact holes using a single mask process, thereby reducing the total number of mask processes. In addition, since a portion of the drain electrode may extend into the pixel region to function as a pixel electrode, the total number of mask processes may be further reduced, thereby simplifying the fabrication process, increasing yield, and reducing fabrication costs.

However, when the source/drain electrode is formed of a transparent conductive material, such as an indium tin oxide, contact resistance between the source/drain region of the active pattern and the source/drain electrode is greater than when a general conductive metal is used. To solve this problem, according to the present invention, a lift-off process may be used. Accordingly, a conductive metal layer may be formed on the patterned photoresist and the photoresist may be removed, thereby simultaneously removing the conductive metal layer and the photoresist without using an additional mask.

Figure 5A:
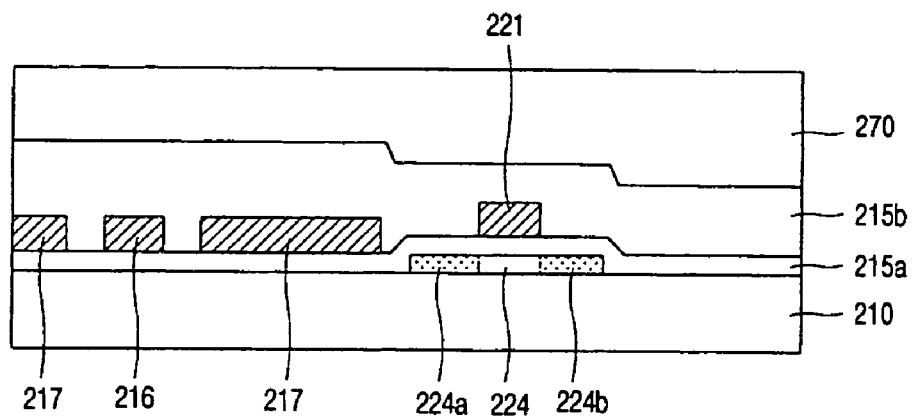
FIGS. 5A to 5E are cross sectional views along III–III' of FIG. 3 of another exemplary method of fabricating an LCD device according to the present invention.

FIGS. 5A to 5E are cross sectional views along III–III' of FIG. 3 of another exemplary method of fabricating an LCD device according to the present invention. In FIGS. 5A to 5E, and exemplary lift-off process of the present invention may be provided. In FIG. 5A, a gate line 216 including a gate electrode 221 and a data line 217 may be simultaneously formed on a substrate 210 where a first insulating layer 215a may have been previously deposited. Then, a second insulating layer 215b may be deposited along an entire surface of the substrate 210, and a photoresist 270, such as a photosensitive material, may be deposited to have a predetermined thickness. The photoresist 270 may include a positive-type photoresist of a NOVOLAK-based resin, wherein regions exposed to a light source may react with a development solution to remove the light-exposed regions. Alternatively, the photoresist 270 may include a negative-type photoresist of an acryl based monomer, wherein regions exposed to a light source may not react with a development solution. The photoresist 270 may be include a solvent for adjusting a viscosity, a photo active based compound for generating a photosensitization, and a resin that is a chemical bonding material.

Figure 5B:
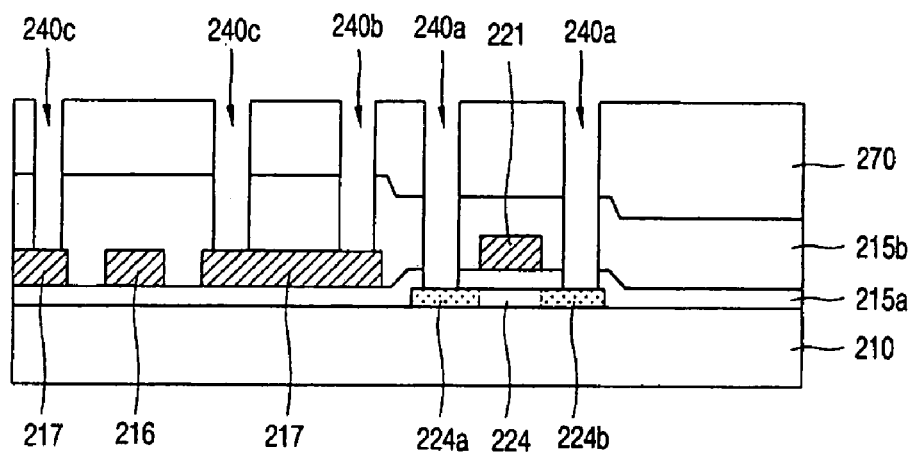

In FIG. 5B, the first insulating layer 215a, the second insulating layer 215b, and the photoresist 270 may be partially removed by a photolithographic process, thereby forming a pair of first contact holes 240a that expose predetermined regions 224a and 224b of an active pattern 224. In addition, the second insulating layer 215b may be partially removed, thereby forming a second contact hole 240b that may expose a first lateral portion of a first segment of the data line 117, and may form a pair of third contact holes 240c that expose a second lateral portion of the first segment of the data line 217 and that expose a first lateral portion of a second segment of the data line 217.

Figure 5C:
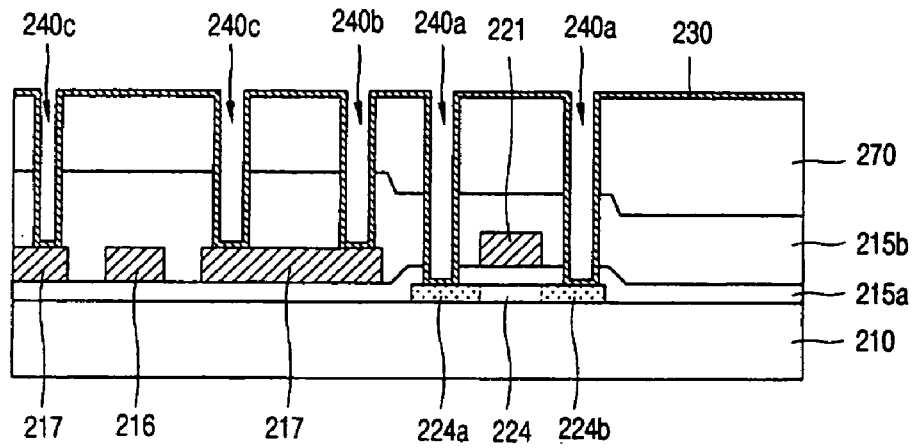

In FIG. 5C, a conductive metal layer 230 may be formed along an entire surface of the substrate 210 upon the patterned photoresist 270. For example, the conductive metal layer 230 may include metal material of low electrical resistance, such as Al, Al alloy, and Mo.

Figure 5D:
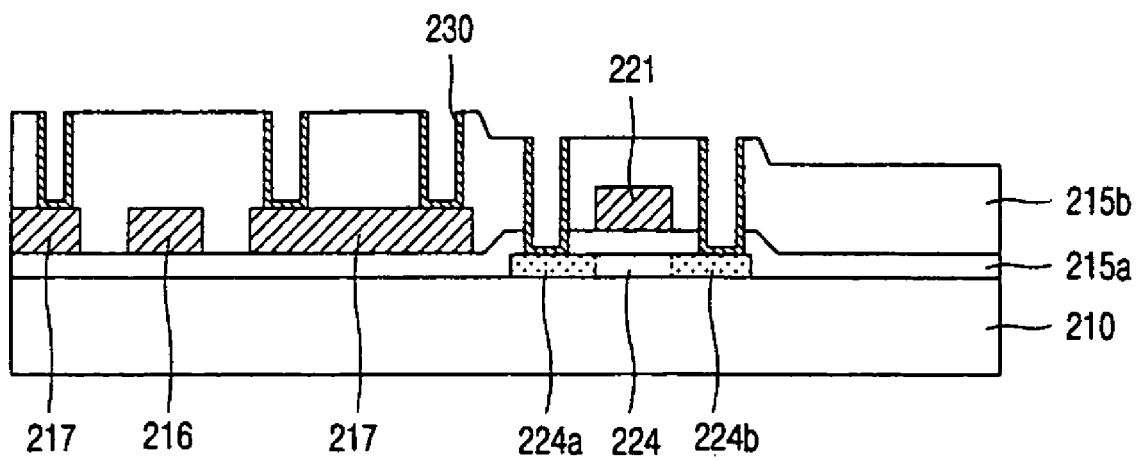

In FIG. 5D, the photoresist 270 and the conductive metal layer 230 formed on the photoresist 270 may be simultaneously removed by a lift-off process. As the result, the conductive metal layer 230 may remain only within the pair of first contact holes 240a formed in the first and second insulating layers 215a and 215b, the second contact hole 240b formed in the second insulating layer 215b, and the pair of third contact holes 240c formed in the second insulating layer 215b.

During the lift off process, the photoresist 270 and the conductive metal layer 230 may be submerged into a solution, such as a stripper. Alternatively, ultrasonic wave energy may be used to remove the photoresist 270 and the conductive metal layer 230.

Figure 5E:
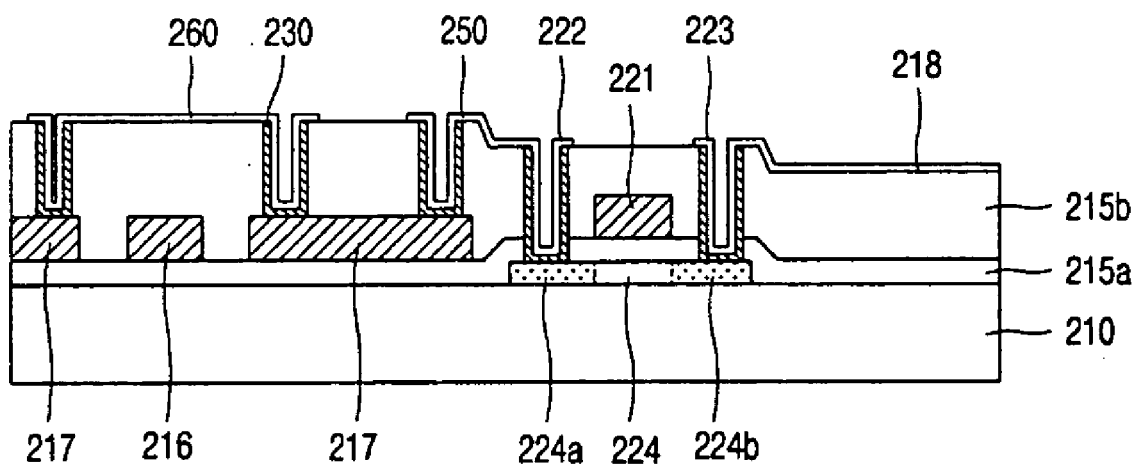

In FIG. 5E, a transparent conductive material may be deposited on the substrate 210, and within each of the contact holes 240a, 240b, and 240c to overlap portions of the conductive metal layer 230 disposed within each of the contact holes 240a, 240b, and 240c. Then, the transparent conductive material may be patterned. Accordingly, the patterned transparent conductive material may include a first connection line 250 have a first portion corresponding to the source electrode 222 connected to the source region 224a through a first one of the first contact holes 240a (in FIG. 5C), and may having a second portion electrically connected to the exposed first lateral portion of the first segment of the data line 217 through the second contact hole 240b (in FIG. 5C). In addition, a second connection line 260 may be formed to include a first portion connected to the exposed second lateral portion of the first segment of the data line 217 through the first one of the pair of third contact holes 240c (in FIG. 5C), and may include a second portion connected to the first lateral portion of the second segment of the data line 217 through the second one of the pair of third contact holes 240c (in FIG. 5C). Furthermore, the transparent conductive material may be patterned to form a drain electrode 223, wherein a first portion of the drain electrode 223 contacts the drain region 224b through the a second one of first contact holes 240a (in FIG. 5C) and a second portion of the drain electrodes 223 may extend along a surface of the second insulating layer 215b into a pixel region to function as a pixel electrode 218.

Although only two contact holes 240b and 240c are shown to expose the lateral portions of the data line 217, multiple contact holes may be formed to expose a corresponding number of surfaces of the data line 217. Accordingly, contact resistance between the data line 217 and the subsequently-formed first and second connection lines 250 and 260 may be reduced.

In addition, although the contact holes 240a, 240b, and 240c are shown having a "U" shape, other geometrical shapes may be used. Moreover, combinations of different geometrical shapes may be used to form the first, second, and third contact holes 240a, 240b, and 240c.

According to the present invention, the gate line and the data line may be simultaneously patterned by forming first and second contact holes using a single mask process, thereby reducing the total number of mask processes. In addition, since a portion of the drain electrode may extend into the pixel region to function as a pixel electrode, the total number of mask processes may be further reduced, thereby simplifying the fabrication process, increasing yield, and reducing fabrication costs.

According to the present invention, the conductive metal layer 230 remaining within the pair of first contact holes 240a may reduce a contact resistance between the data line 217 and the source region 224a and between the drain electrode 223 and the drain region 224b. In addition, the conductive metal layer 230 remaining within the pair of third contact holes 240c may reduce a contact resistance between the segmented data line 217.

It will be apparent to those skilled in the art that various modifications and variation can be made in the LCD device and method of fabricating an LCD of the present invention without departing from the spirit or scope of the invention. Thus, it is intended that the present cover the modifications and variations of this invention provided they come within the scope of the appended claims and their equivalents.

What is claimed is:
1. A method of fabricating a liquid crystal display device, comprising:
    forming an active pattern on a substrate;
    forming a first insulating layer on the substrate over the active pattern;

forming a gate line including a gate electrode and a data line on the substrate, the data line including a plurality of segmented portions electrically disconnected from each other;

forming source and drain regions in the active pattern;

forming a second insulating layer on the first insulating layer, the gate line, and the data line;

simultaneously forming a pair of first contact holes through the first and second insulating layers exposing the source and drain regions of the active pattern, a second contact hole through the second insulating layer exposing a first lateral portion of a first one of the segmented portions of the data line, and a pair of third contact holes through the second insulating layer, a first one of the pair of third contact holes exposing a second lateral portion of the first one of the segmented portions of the data line, and a second one of the pair of third contact holes exposing a first lateral portion of a second one of the segmented portions of the data line;

forming a conductive material along an entire surface of the substrate; and patterning the conductive material to form a drain electrode, a first connection line, and a second connection line on the second insulating layer.

2. The method according to claim 1, wherein the drain electrode includes a first portion contacting the drain region of the active pattern through a first one of the pair of contact holes and a second portion extending along a surface of the second insulating layer into a pixel region of the liquid crystal display device.

3. The method according to claim 1, wherein the first connection line includes a first portion contacting the source region of the active pattern through a second one of the pair of first contact holes and a second portion contacting the first lateral portion of the first one of the segmented portions of the data line through the second contact hole.

4. The method according to claim 3, wherein the second connection line includes a first portion contacting the second lateral portion of the first one of the segmented portions of the data line through a first one of the pair of third contact holes, and a second portion contacting a first lateral portion of a second one of the segmented portions of the data line through a second one of the pair of third contact holes.

5. The method according to claim 1, wherein the active pattern includes a silicon layer.

6. The method according to claim 5, wherein the silicon layer includes a crystallized amorphous silicon thin film.

7. The method according to claim 1, wherein the plurality of segmented portions of the data line are disposed along opposing side portions of the gate line.

8. The method according to claim 1, wherein the step of forming the first, second, and third contact holes comprises the steps of:

depositing a photoresist onto the second insulating material;

patterning the photoresist;

forming the pair of first contact holes through the first insulating layer, the second insulating layer, and the patterned photoresist, and forming the second contact hole and the pair of third contact holes through the second insulating layer and the patterned photoresist; and removing the patterned photoresist.

9. The method according to claim 8, further including, before removing the patterned photoresist, the steps of:

forming a first portion of a conductive metal layer along an entire surface of the photoresist pattern, a second portion of the conductive metal layer within the first, second, and third contact holes formed through the photoresist pattern, and a third portion of the conductive metal layer within each of the pair of first contact holes through the first and second insulating layer, the second contact hole and the pair of third contact holes through the second insulating layer;

removing the photoresist pattern and the first and second portions of the conductive metal layer using a lift-off process such that the third portion of the conductive metal layer remains in the first, second, and third contact holes.

10. The method according to claim 1, wherein the step of forming source and drain regions includes injecting impurity ions into predetermined regions of the active pattern using the gate electrode as a mask.

11. The method according to claim 10, wherein the impurity ions include a Group V impurity.

12. The method according to claim 11, wherein the Group V impurity includes phosphorous.

13. The method according to claim 10, wherein the impurity ions include a Group III impurity.

14. The method according to claim 13, wherein the Group III impurity includes boron.

15. The method according to claim 1, wherein the conductive material includes a transparent conductive material.

16. The method according to claim 1, wherein the drain electrode extends into a pixel region of the liquid crystal display device to form a pixel electrode.

17. A liquid crystal display device, comprising:

an insulating substrate;

an active pattern formed on the insulating substrate, the active pattern having source, drain, and channel regions;

a first insulating layer formed on the insulating substrate and the active pattern;

a gate line including a gate electrode and a data line formed on the first insulating layer, the data line including a plurality of segmented portions each electrically disconnected from each other;

a second insulating layer formed on and between the gate line, the gate electrode, and the plurality of segmented portions of the data line; and a plurality of transparent conductive material segments on the second insulating layer, wherein the first and second insulating layers include a pair of first contact holes exposing the source and drain regions of the active pattern, and the second insulating layer includes a second contact hole exposing a first lateral portion of a first one of the segment portions of the data line, and a pair of third contact holes exposing a second lateral portion of the first one of the segment portions of the data line and exposing a first lateral portion of a second one of the segment portions of the data line.

18. The device according to claim 17, wherein the plurality of transparent conductive material segments include a first portion, a second portion, and a third portion.

19. The device according to claim 18, wherein the first portion contacts the drain region of the active pattern through a first one of the pair of first contact holes and extends along a surface of the second insulating layer into a pixel region of the liquid crystal display device to function as a pixel electrode.

20. The device according to claim 18, wherein the second portion has a first region contacting the source region of the active pattern through a second one of the pair of first contact holes, and a second region contacting the first lateral portion of the first one of the segment portions of the data line through the second contact hole.

21. The device according to claim 20, wherein the third portion has a first region contacting the second lateral portion of the first one of the segment portions of the data line through a first one of the pair of third contact holes, and a second region contacting the first lateral portion of the second one of the segment portions of the data line through a second one of the pair of third contact holes.

22. The device according to claim 17, wherein the plurality of segmented portions of the data line are disposed along opposing side portions of the gate line.

23. The device according to claim 17, further comprising a conductive metal within each of the first, second, and third contact holes.

24. The device according to claim 23, wherein the conductive metal includes first portions disposed within each of the pair of first contact holes, a second portion disposed within the second contact hole, and third portions disposed within each of the pair of third contact holes.

25. The device according to claim 24, wherein the first portions of the conductive metal are disposed between the transparent conductive material and the source region of the active pattern and between the transparent conductive material and the drain region of the active pattern.

26. The device according to claim 25, wherein the second portion of the conductive metal is disposed between the transparent conductive material and the first lateral portion of the first one of the segment portions of the data line.

27. The device according to claim 26, wherein the third portions of the conductive metal are disposed between the transparent conductive material and the second lateral portion of the first one of the segment portions of the data line and between the transparent conductive material and the first lateral portion of the second one of the segment portions of the data line.

* * * * *